Patented Mar. 8, 1932

1,848,524

UNITED STATES PATENT OFFICE

MAX HAGEDORN AND EUGEN GUEHRING, OF DESSAU IN ANHALT, GERMANY, ASSIGNORS TO I. G. FARBENINDUSTRIE AKTIENGESELLSCHAFT, OF FRANKFORT-ON-THE-MAIN, GERMANY

CELLULOSE ESTERS OF INORGANIC ACIDS

No Drawing. Application filed October 25, 1927, Serial No. 228,689, and in Germany October 26, 1926.

The present invention relates to a process of preparing cellulose esters of inorganic acids and to the new compounds obtainable thereby.

We have found that cellulose esters of inorganic acids are obtainable by causing an alkali cellulose to react with a chloride of an inorganic acid. The reaction occurs especially easily when using chlorides of polyvalent inorganic acids as, for instance, of sulfuric or phosphoric acid.

The cellulose esters obtained by the new process are colloidally dispersed in the presence of water. They are useful for various purposes, e. g. as impregnating agents.

According to the conditions of the reaction different degrees of esterification of the cellulose are obtainable and the reaction products differ with respect to colloidal dispersion, conductivity and mechanical properties.

The speed of the reaction, the yield and the composition of the ester produced depend on the character of the acid chloride and the nature of the alkali cellulose. With chlorides of strong acids the reaction proceeds with great energy and with chlorides of more feeble acids and alkali cellulose reacts slowly. The reactivity of the alkali cellulose depends on the manner in which it is previously treated. The best yield and the highest degree of esterification are achieved when cotton is used which has been swollen for at least four hours by means of a sodium hydroxide solution of 40 per cent strength at about −10° C. and has been pressed until its weight is double or threefold of the original weight. The course of the reaction may be influenced by choice of the parent material, by the concentration of the alkali hydroxide solution and by the duration of the treatment of the cellulose with the alkali, by the use of different proportions and different conditions of aggregation of the acid chloride, by regulating the reaction temperature and by using indifferent media for the reaction.

The following examples illustrate the invention without limiting it, the parts being by weight:

1. 100 parts of bleached cotton-linters are swollen in sodium hydroxide solution of 40 per cent strength, while cooling with a mixture of ice and salt. After 4 hours the cotton is pressed until its weight is 300 parts. The soda-cellulose thus obtained is introduced in small portions into an ice-cold solution of 160 parts of phosphorous-oxychloride in 900 parts of benzene. The heat evolved first raises the temperature of the benzene to the boiling point and then the reaction takes a gentle course and a tough magma settles to the bottom of the vessel. After 12 hours the supernatant liquid is drawn off and the deposit is washed with alcohol and ether, dried in a vacuum and treated with water. The colloidal aqueous dispersion is freed from all electrolytes by dialysis and from this purified dispersion cellulose phosphate is precipitated by addition of methanol. It is a nearly white body, colloidally dispersed by water and containing 16 per cent of $PO_4$. The yield amounts to 80 per cent of the weight of the cellulose used.

2. 100 parts of bleached cotton-linters are swollen by means of sodium hydroxide solution of 40 per cent strength while cooling with a mixture of ice and salt. After 4 hours the cotton is pressed until its weight is 400 parts and introduced in small portions into a mixture of 1800 parts of benzene and 220 parts of sulfuryl chloride. There is produced a cellulose-sulfuric acid ester which is worked up as described in Example 1. It is a pure whitish body colloidally dispersed by water and not hygroscopic; it contains 60 per cent of $SO_4$.

What we claim is:

1. The process which comprises causing an alkali cellulose to react with an oxygen containing chloride of an inorganic acid.

2. The process which comprises causing an alkali cellulose to react with an oxygen containing chloride of an inorganic acid in the presence of an inert diluent.

3. The process which comprises causing an alkali cellulose to react with an oxygen containing chloride of a polyvalent inorganic acid in the presence of an inert diluent.

4. The process which comprises causing an alkali cellulose to react with an oxygen containing chloride of sulfuric acid in the presence of benzene.

5. The process which comprises subjecting cellulose to the action of a sodium hydroxide solution of about 40 per cent strength at a temperature of about −10° C. for about 4 hours, pressing out the reaction product until it has about two to four times its original weight and subjecting it to the action of an oxygen containing chloride of an inorganic acid.

6. The process which comprises subjecting cellulose to the action of a sodium hydroxide solution of about 40 per cent strength at a temperature of about −10° C. for about 4 hours, pressing out the reaction product until it has about two to four times its original weight and subjecting it to the action of an oxygen containing chloride of an inorganic acid in the presence of benzene.

7. The process which comprises subjecting 100 parts of cellulose to the action of a sodium hydroxide solution of about 40 per cent strength at a temperature of about −10° C. for about 4 hours, pressing out the reaction product until it has about two to four times its original weight and subjecting it to the action of about 220 parts of sulfuryl chloride in the presence of about 1800 parts of benzene.

8. As new articles of manufacture, stable cellulose esters of inorganic acids, said esters being colloidally dispersed by water.

9. As new articles of manufacture, stable cellulose esters of polyvalent inorganic acids, said esters being colloidally dispersed by water.

10. As a new article of manufacture, the whitish colored non-hygroscopic cellulose ester of sulfuric acid, containing 60 per cent of $SO_4$, said ester being colloidally dispersed by water.

11. The process which comprises causing an alkali cellulose to react with an oxygen containing chloride of phosphoric acid in the presence of benzene.

12. As new articles of manufacture, the stable cellulose esters of sulfuric acid, said esters being colloidally dispersed by water.

13. As new articles of manufacture, the stable cellulose esters of phosphoric acid, said esters being colloidally dispersed by water.

14. As a new article of manufacture, the whitish colored cellulose ester of phosphoric acid containing 16% of $PO_4$, said ester being colloidally dispersed by water.

In testimony whereof, we affix our signatures.

MAX HAGEDORN.
EUGEN GUEHRING.